United States Patent
Liivik et al.

(10) Patent No.: US 12,361,847 B2
(45) Date of Patent: *Jul. 15, 2025

(54) SIGNALING DEVICE AND SYSTEM FOR INCREASING VISIBILITY OF A MOBILE ROBOT

(71) Applicant: STARSHIP TECHNOLOGIES OÜ, Tallinn (EE)

(72) Inventors: Märt Liivik, Vihula vald (EE); Andrew Macks, Ääamäe (EE); Markus Zimmermann, Tallinn (EE); Siim Viilup, Tallinn (EE); Markus Järve, Joeääre talu (EE); Tiit Liivik, Tallinn (EE); Mikko Seppänen, Helsinki (FI); Antti Mäkelä, Helsinki (FI)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,126

(22) Filed: Jan. 12, 2022

(65) Prior Publication Data
US 2022/0148466 A1    May 12, 2022

Related U.S. Application Data

(63) Continuation of application No. 16/677,344, filed on Nov. 7, 2019, now Pat. No. 11,250,741, which is a (Continued)

(30) Foreign Application Priority Data

May 11, 2017   (EP) ..................................... 17170549
Jan. 5, 2018   (EP) ..................................... 18150516

(51) Int. Cl.
*G09F 9/33*    (2006.01)
*B60Q 1/26*    (2006.01)
(Continued)

(52) U.S. Cl.
CPC ............ *G09F 17/00* (2013.01); *B60Q 1/2657* (2013.01); *B60Q 1/503* (2013.01); *B60Q 1/507* (2022.05);
(Continued)

(58) Field of Classification Search
USPC ....... 340/815.45, 901, 425.5, 435, 436, 463, 340/468, 475, 478
See application file for complete search history.

(56) References Cited

U.S. PATENT DOCUMENTS 4,549,841 A    10/1985  Ishige
5,664,928 A     9/1997  Stauber
(Continued)

FOREIGN PATENT DOCUMENTS

DE    202014006790    10/2014
JP         H0512999     2/1993
(Continued)

OTHER PUBLICATIONS

WIPO, (IB/373) International Preliminary Report on Patentability Chapter I, PCT/EP2018/061737, Nov. 12, 2019.
(Continued)

*Primary Examiner* — Daniel Previl
(74) *Attorney, Agent, or Firm* — Siritzky Law, PLLC

(57) ABSTRACT

A signaling device for increasing visibility of a mobile robot. The signaling device comprises (a) a base section, attached with a rotational joint to a side of the mobile robot, said rotational joint allowing the device to rotate clockwise and/or anticlockwise relative to the mobile robot, the rotational joint constructed and adapted to return the device to an equilibrium position; and (b) a body section comprising a mast, the body section flexibly attached to the base section at a lower extreme of the body section.

33 Claims, 8 Drawing Sheets

Related U.S. Application Data continuation of application No. PCT/EP2018/061737, filed on May 7, 2018.

(51) Int. Cl.

| | | |
|---|---|---|
| *B60Q 1/50* | (2006.01) | |
| *G08B 5/38* | (2006.01) | |
| *G09F 17/00* | (2006.01) | |
| *G09F 21/04* | (2006.01) | |
| *B60Q 1/04* | (2006.01) | |

(52) U.S. Cl.
CPC ............... *G08B 5/38* (2013.01); *G09F 21/04* (2013.01); *B60Q 1/0491* (2013.01); *G09F 2017/0075* (2013.01)

(56) References Cited

U.S. PATENT DOCUMENTS

| | | | |
|---|---|---|---|
| 5,942,869 A | 8/1999 | Katou et al. | |
| 6,430,855 B1 * | 8/2002 | Gertz | G09F 7/18 40/607.1 |
| 6,467,293 B1 | 10/2002 | Goosman | |
| 6,602,037 B2 | 8/2003 | Winkler | |
| 6,975,221 B2 * | 12/2005 | Monck | G08B 21/24 340/572.1 |
| 7,073,634 B2 | 7/2006 | Mitchell et al. | |
| 7,320,289 B1 | 1/2008 | Clarke et al. | |
| 7,894,939 B2 | 2/2011 | Zini et al. | |
| 7,931,431 B2 | 4/2011 | Benedict et al. | |
| 8,010,230 B2 | 8/2011 | Zini et al. | |
| 8,104,601 B2 | 1/2012 | Hayduchok et al. | |
| 8,204,624 B2 | 6/2012 | Zini et al. | |
| 8,485,285 B2 | 7/2013 | Ferrigni | |
| 8,682,487 B2 | 3/2014 | Kurth et al. | |
| 8,874,360 B2 | 10/2014 | Klinger et al. | |
| 8,948,914 B2 | 2/2015 | Zini et al. | |
| 9,020,632 B2 | 4/2015 | Naylor | |
| 9,031,692 B2 | 5/2015 | Zhu | |
| 9,244,147 B1 | 1/2016 | Soundararajan et al. | |
| 9,256,852 B1 | 2/2016 | Myllymaki | |
| 9,266,675 B2 | 2/2016 | Yamashita | |
| 9,373,149 B2 | 6/2016 | Abhyanker | |
| 9,557,740 B2 | 1/2017 | Crawley | |
| 9,561,941 B1 | 2/2017 | Watts | |
| 9,694,976 B1 | 7/2017 | Wurman et al. | |
| 9,844,879 B1 | 12/2017 | Cousins et al. | |
| 11,250,741 B2 * | 2/2022 | Liivik | G09F 17/00 |
| 2003/0165373 A1 | 9/2003 | Felder et al. | |
| 2005/0207876 A1 | 9/2005 | Springwater | |
| 2006/0237239 A1 | 10/2006 | Bruner et al. | |
| 2007/0283877 A1 | 12/2007 | Durkin | |
| 2008/0282960 A1 | 11/2008 | Sherrod | |
| 2011/0040427 A1 * | 2/2011 | Ben-Tzvi | B62D 55/12 701/2 |
| 2012/0090110 A1 | 4/2012 | Van Den Berg et al. | |
| 2013/0009832 A1 | 1/2013 | Apostolos et al. | |
| 2013/0019793 A1 | 1/2013 | Carr | |
| 2013/0110281 A1 | 5/2013 | Jones et al. | |
| 2013/0138246 A1 | 5/2013 | Gutmann et al. | |
| 2013/0332021 A1 | 12/2013 | Goren | |
| 2014/0054437 A1 | 2/2014 | Kalavitz | |
| 2014/0100693 A1 | 4/2014 | Fong et al. | |
| 2014/0110183 A1 * | 4/2014 | Rudakevych | B60L 58/12 180/68.5 |
| 2014/0136414 A1 | 5/2014 | Abhyanker | |
| 2014/0254896 A1 | 9/2014 | Zhou et al. | |
| 2014/0313761 A1 | 10/2014 | Nelson-Herron | |
| 2014/0365258 A1 | 12/2014 | Vestal et al. | |
| 2015/0006005 A1 | 1/2015 | Yu et al. | |
| 2015/0045945 A1 | 2/2015 | Zini et al. | |
| 2015/0100152 A1 | 4/2015 | Barragan Trevino et al. | |
| 2015/0183581 A1 | 7/2015 | Worsley | |
| 2015/0205297 A1 | 7/2015 | Stevens et al. | |
| 2015/0379468 A1 | 12/2015 | Harvey | |
| 2016/0073104 A1 | 3/2016 | Hillebrand et al. | |
| 2016/0185466 A1 | 6/2016 | Dreano, Jr. | |
| 2016/0207710 A1 | 7/2016 | Conrad et al. | |
| 2016/0272291 A1 | 9/2016 | Outa et al. | |
| 2016/0325928 A1 | 11/2016 | Lepek et al. | |
| 2016/0355337 A1 | 12/2016 | Lert et al. | |
| 2016/0368464 A1 | 12/2016 | Hassounah | |
| 2017/0017237 A1 | 1/2017 | Tokuyama et al. | |
| 2017/0061791 A1 * | 3/2017 | Cherewka | G08G 1/04 |
| 2017/0100837 A1 | 4/2017 | Zevenbergen et al. | |
| 2017/0185853 A1 | 6/2017 | Yokota et al. | |
| 2017/0212523 A1 | 7/2017 | Witelson | |
| 2017/0220981 A1 | 8/2017 | Shucker et al. | |
| 2017/0267452 A1 | 9/2017 | Goren et al. | |
| 2017/0273527 A1 | 9/2017 | Han et al. | |
| 2018/0020896 A1 | 1/2018 | High et al. | |
| 2018/0033350 A1 | 2/2018 | Rios | |
| 2018/0089013 A1 | 3/2018 | Otsuka et al. | |
| 2018/0216941 A1 | 8/2018 | Zhu et al. | |
| 2018/0232839 A1 | 8/2018 | Heinla et al. | |
| 2018/0349834 A1 | 12/2018 | Heinla et al. | |
| 2019/0168392 A1 * | 6/2019 | Väin | G06Q 10/087 |

FOREIGN PATENT DOCUMENTS

| | | |
|---|---|---|
| JP | 2009037623 A | 2/2009 |
| JP | 2014186114 | 10/2014 |
| WO | WO 2011/035839 | 3/2011 |

OTHER PUBLICATIONS

WIPO, (ISA/210) International Search Report, PCT/EP2018/061737, Nov. 15, 2018.

WIPO, (ISA/237) Written Opinion of the International Searching Authority, PCT/EP2018/061737, Nov. 15, 2018.

Anonymous: "Lieferroboter Starship: "Klauen würde ich ihn nicht"—Auto—Tagesspiegel" ("I wouldn't steal him") Nov. 29, 2015, Retrieved from the Internet: URL: http://www.tagesspiegel.de/mobil/lieferroboter-starship-klauen-wuerde-ich-ihn-nicht/12647114.html, English translation.

Baker: "Automated Street Crossing for Assistive Robots," Proc. 2005 IEEE, Jun. 28-Jul. 1, 2005.

Jeniece Pettitt: "Forget delivery drones, meet your new delivery robot," Nov. 2, 2015, Retrieved from the Internet: URL: https://www.cnbc.com/2015/11/02/forget-delivery-drones-meet-your-new-delivery-robot.html.

JP 2009037623 A, Feb. 19, 2009, Korea Electronics Telecomm, English translation.

* cited by examiner

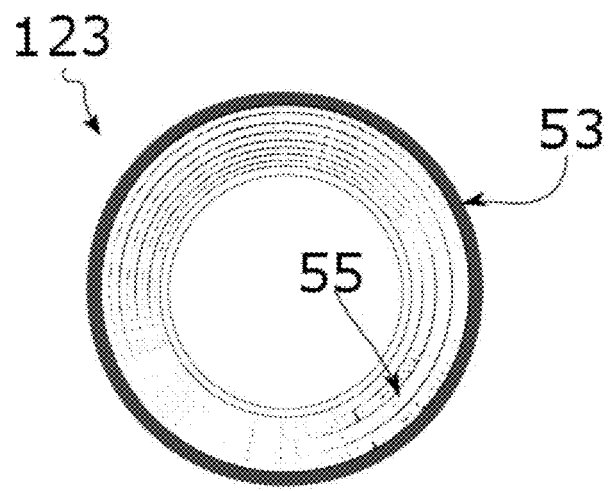
FIG. 5
FIG. 6
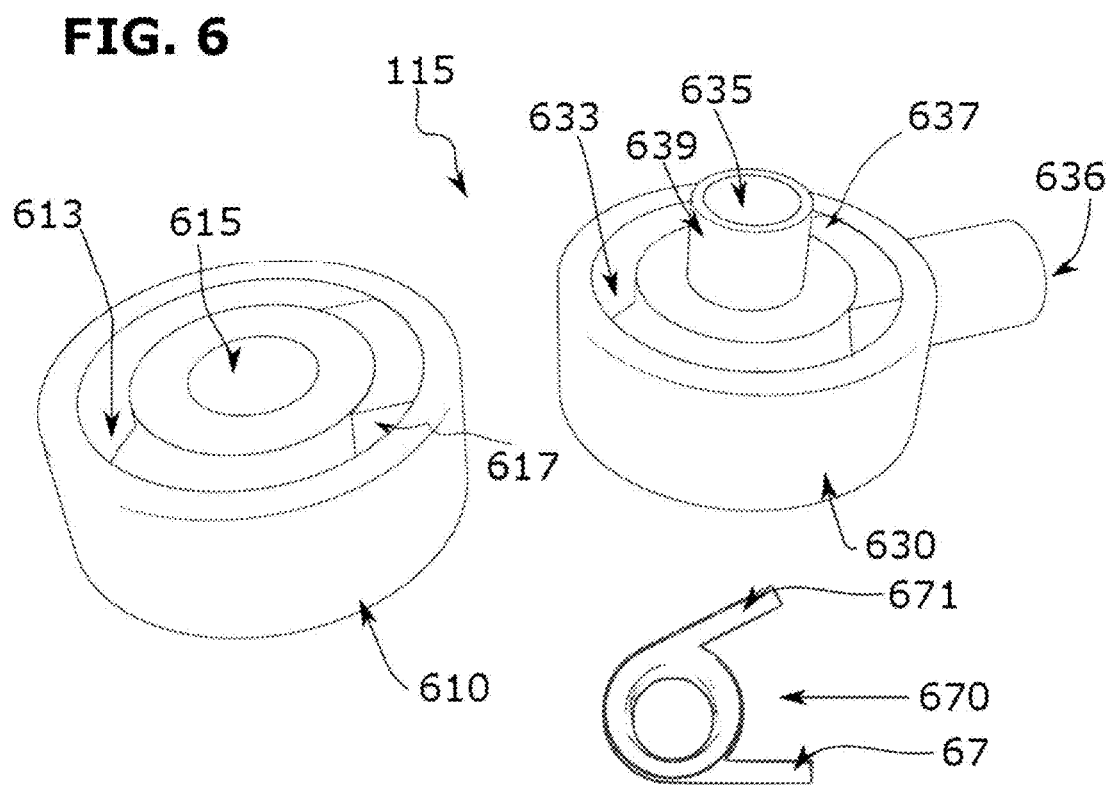

FIG. 9
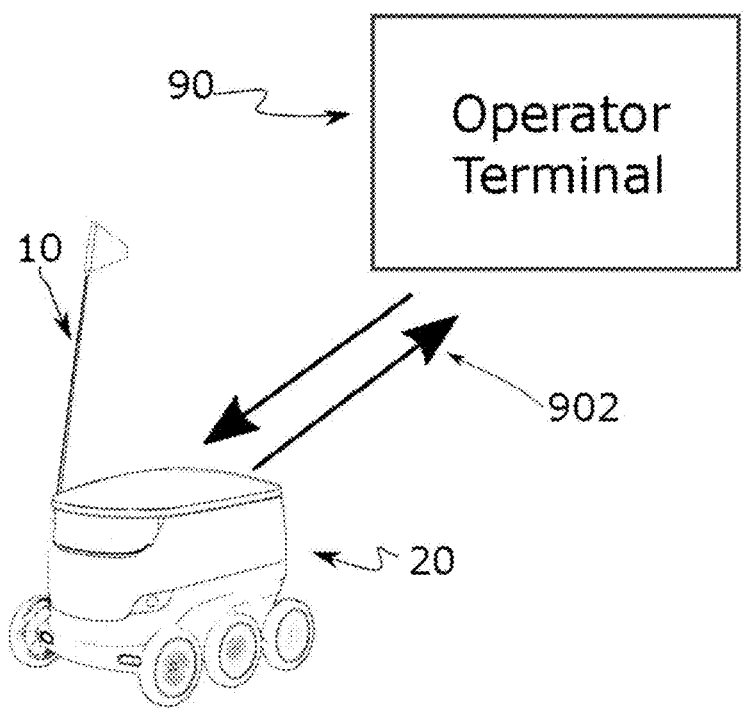
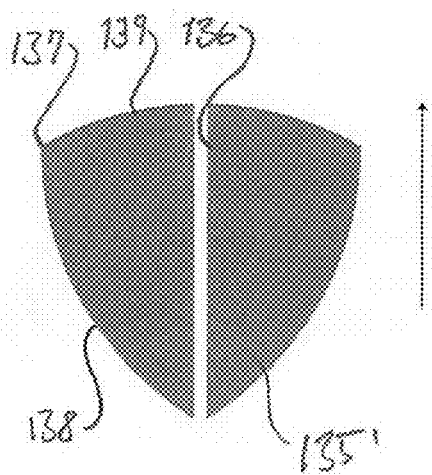
FIG. 10
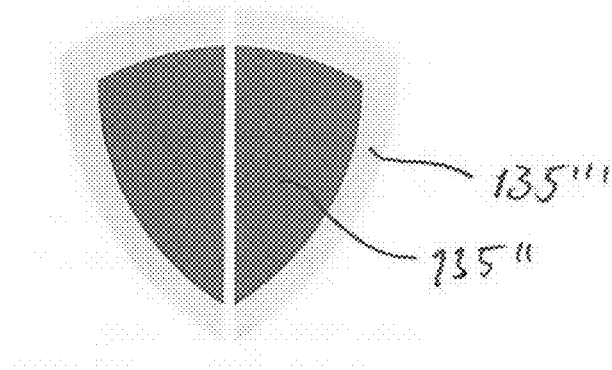
FIG. 11
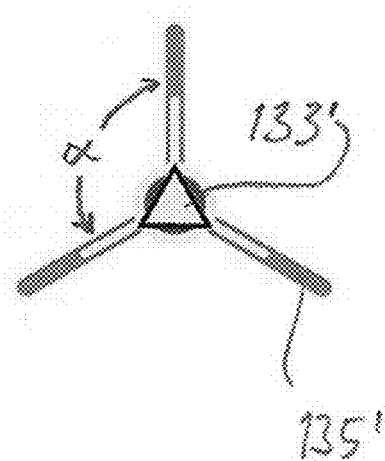
FIG. 12

SIGNALING DEVICE AND SYSTEM FOR INCREASING VISIBILITY OF A MOBILE ROBOT

RELATED APPLICATIONS

This application is a continuation of U.S. application Ser. No. 16/677,344, filed Nov. 7, 2019, which is a continuation of PCT/EP2018/061737, filed May 7, 2018, which claims the benefit of EP 17170549.4, filed May 11, 2017, and EP 18150516.5, filed Jan. 5, 2018, the entire contents of all of which are hereby fully incorporated herein by reference for all purposes.

FIELD

The present invention relates to the field of increasing the saliency of a mobile robot. More particularly, the present invention relates to a signaling device and system that increase the visibility of a mobile robot.

INTRODUCTION

Technology has always been about improving the quality of life for people. More and more tasks are being automated and conducted by robots. Robotics, as a field on its own, had such a massive development in recent years that it made it possible to have robots driving among other traffic participants, such as pedestrians, bicyclists, or cars, accomplishing the robots' specified task. Usually, these robots are wheeled of a relatively low height, which can make it hard to be noticed by other traffic participants. Thus, means of improving the visibility of such robots through increased salience and conspicuity can be advantageous. At the same time, since these robots can drive among other traffic participants (that is, use sidewalks or walkways, as well as cross car roads), the solution of increasing their visibility must address pedestrian and driver safety. Furthermore, an autonomous or semi-autonomous robot should be able to drive in many locations facing different obstacles on its way. The added device for increasing its visibility should be able to avoid such obstacles in a manner not to decrease the scope of usability of such robots.

U.S. Pat. No. 6,975,221 B2 discloses a luggage identifier for air and rail travelers. It is used to uniquely identify a luggage piece in an airport or train station. The luggage identifier for air and rail travelers is comprised of a battery-powered remote controller, a latch release mechanism connected to a flexible flagpole held under spring tension in collapsed state. The latch release mechanism contains a radio wave receiver so that it can be controlled by the remote controller. Under the signal of the remote controller triggered by the owner of the luggage the latch mechanism will release the flagpole which extends upwards beyond the luggage. On top of the flexible flagpole a unique identifier is mounted so that the owner of the luggage can identify their own luggage. This device is specifically designed and disclosed to be used on luggage. U.S. Pat. No. 6,430,855 B1 discloses a sign stand with a flexible upper portion which is made of a support platform in the base and a mast upstanding from the base. The mast further comprises a lower and upper portion, where the lower portion is made of a more rigid material than the upper portion. The mast itself is connected to the base by means of a spring. The purpose of the device is to make the sign stands safer in case they are hit by a car. It accomplishes this by means of its structure, which allows it to bend according to the shape of the car instead of bending directly towards the front windshield of the car, thus breaking it and posing a real danger for the passengers. This device is specifically adapted to be used as a sign-stand.

The prior art lacks a device that can be adapted for increasing the visibility of mobile robots among traffic participants addressing the challenges that this task introduces.

SUMMARY

It is an object of the present invention to provide an improved or alternative signaling device, system and method for a robot, particularly driving on walkways.

This object is attained in accordance with the present invention as described and claimed.

In a first embodiment, the invention discloses a signaling device for increasing visibility of a mobile robot. The signaling device comprises a signaling section configured to at least one of increasing the visibility, salience, and conspicuity of a mobile robot and signaling messages. That is, the signaling section can be adapted to draw the attention of traffic participants to it so that they notice the signaling device and, preferably the mobile robot. The signaling section can also be adapted to signal messages to traffic participants or other people and/or robots interacting with the signaling device and preferably with the mobile robot. The signaling section can then be making the signaling device and preferably the mobile robot more visible, conspicuous and salient to the surroundings, which can be particularly advantageous if the signaling device and preferably the mobile robot are not very tall. The signaling section is also advantageous as it can allow for signaling of various messages to the surroundings of the signaling device and preferably the robot.

The signaling device further comprises a body section comprising an elongated member configured to support the signaling section. Such an elongated member can be advantageous, as increasing the height of the signaling device can lead to it being easier to notice or spot.

The signaling device further comprises a base section comprising a flexible component configured to bend when an external force acts on the signaling device. The base section with such flexibility capacity due to the flexible component can increase the safety of the signaling device in case of inadvertent collisions with other traffic participants or with other surroundings.

Furthermore, the base section can make it practical to fold or at least partially incline the signaling device away from the vertical or substantially vertical direction, preferably when the mobile robot can be entering smaller spaces.

The present invention also relates to an advantageous signaling device comprising a 3-dimensional structure. This structure can preferably catch more attention by human beings as well as by automated obstacle detection or image recognition as used in self-driving vehicles and can, thus, avoid collisions or late reactions by other road or walkway users.

The 3-dimensional structure can comprise 1 to 5, preferably 1 or 3 to 5 display areas or flag like structures centrally and/or radially arranged with respect to a longitudinal axis of the neighboring section of the elongated member. The longitudinal axis of neighboring sections of the elongated member can be prolonged by a rod-like holder for the display areas or flags and/or one or more rows of light-emitting devices (LEDs) as will be described later in more detail. This prolongation can have a longitudinal axis being aligned with the elongated member below. In any case, the display areas or flags can extend directly radially away from such structure or at an angle away from that structure.

The display areas can be equiangularly distributed with respect to the longitudinal axis of the neighboring section of the elongated member. Alternatively, they could also be radially arranged with differing angles towards each other, such as an arrow-like flag to the front and two flags to the back being each arranged more than 120° from the front flag so that the back flags describe an angle between them being smaller than 120°. This depends on the different applications of a robot and other factors, such as a preferred detection from a specific side. The position of the display areas can also be changed, e.g., in order to identify the direction of travel. Should it travel to the left, the flags can turn to the left etc.

Preferably 3 display areas can be arranged in a radial orientation to the longitudinal axis of the neighboring section of the elongated member with a 120° angle between neighboring display areas.

The display area(s) can have a visual center of gravity in the upper part of the display area(s). The term visual center is intended to mean that from a projection point of view, a spectator would locate the center of gravity into the upper part while the thickness of the display areas or flags or any other structure thereof may bring the center of gravity to a different location. The reason is that this visual perception assists a human spectator or an image recognition to better realize the signaling section as it appears more instable or unfamiliar with common structures. Alternatively, the structure can be provided in a shape that is better recognizable as man-made.

The 3 display areas can be arranged so that each or some or just one has a basic projective shape of a triangle. The triangle can further be oriented with a straight edge at or close to the longitudinal axis of the neighboring section of the elongate member or a row of LEDs. At an opposite corner to that straight edge, the corner can preferably be opposite to the upper section of the straight edge. This can provide the positive effect as described before. Further, at least one of the edges connecting that corner with the straight edge can have a convex shape, is preferably with an even curvature and/or spherical shape. Other shapes can be realized as well, such as concave edges etc.

The signaling section can comprises at least one, preferably three (3) display areas comprising at least one of a salient center part and an outline that is at least partially arranged around the center part and that can be at least white and/or reflective.

The display areas can be essentially flat and/or can have a projected surface of at least 90 $cm^2$, preferably 150 $cm^2$, more preferably 200 $cm^2$, even more preferably at least 300 $cm^2$, most preferably around 360 $cm^2$.

In some embodiments, the flexible component of the base section of the signaling device can comprise a spring. This spring can be preferably a helical spring. The spring can be configured to bend when the signaling device is under the influence of an external force. The spring can preferably bend forward and backward, that is, the signaling device can rotate forward and backward, preferably with respect to the motion direction of the mobile robot. If the signaling device inadvertently collides with a car, a person or another traffic participant, the force of the collision can make it rotate, avoiding harm to the object of collision and to the signaling device itself. Furthermore, the mobile robot that the signaling device can preferably be attached to needs to pass through a smaller opening than the height of the signaling device on the robot, the spring can allow the signaling device to bend while the robot is passing through such small opening, and then spring back up afterwards. The spring can comprise a spring constant of 5 to 20 N/mm, preferably 10 to 15 N/mm. The spring constant can also be referred to as rate. A spring constant in this interval can be particularly advantageous, as it provides a good balance between being too flexible, that is, too easily moved, and not flexible enough, that is, potentially more dangerous during collisions.

In some embodiments comprising a spring at the base section of the signaling device, the spring can be enveloped by an outer layer for damping its possible oscillation. Such outer layer can preferably comprise a heat-shrinking material, more preferably a heat-shrinking plastic, even more preferably a heat-shrinking tube with a diameter in the range of 0.5-2 mm bigger than the diameter of spring. This can be an advantage, as the heat-shrinking tube can be placed on the spring and shrunk, allowing for a tight fit, concealing of the spring, and reducing of the spring constant, leading to faster dampening of the oscillations.

In some other embodiments, the flexible component of the base section of the signaling device can comprise a joint. This can preferably be a plastic joint configured to elastically deform under the influence of an external force. The joint can be an alternative to the spring. It can comprise a 3D printed piece that is flexible in some directions but not in any direction. The advantage can be better control of the spring constant of such joint, longer durability, lighter weight, and better visual appearance than the spring. Furthermore, such embodiment can be achieved without a further heat-shrinking layer placed around it. Note that the joint can comprise an effective spring constant in the similar range to the spring, or slightly larger, so as to compensate for the lack of the shrinking layer. The plastic joint can also be manufactured via injection molding.

In some embodiments, the base section can further comprise a hinge for attaching the signaling device to a mobile robot by means of a rotational joint. The rotational joint can allow the signaling device to rotate clockwise and/or anti-clockwise with respect to an axis perpendicular to the joint surface between the signaling device and the mobile robot. The rotational joint can further increase the flexibility of the signaling device in case of collisions or when passing through a smaller space. Furthermore, the rotational joint can allow the signaling device to significantly bend, so that it is parallel or substantially parallel to the direction of motion of the robot.

In some embodiments, the hinge can further comprise a second spring, preferably a torsion spring, configured to guide the rotation of the signaling device, said spring being preferably a torsion spring. In some embodiments, the second spring can be further configured to return the signaling device to its equilibrium position. That is, the second spring can be biased towards the equilibrium position, said position preferably being pointed upright or substantially upright, in order to preferably increase the perceived height of the signaling device and therefore of the mobile robot. The second spring or torsion spring can comprise a torsion coefficient (also referred to as rate, spring constant, and/or torsion elastic modulus) in the range of 5 to 20 N mm/degree, more preferably 10 to 15 N mm/degree.

In some embodiments, the signaling section of the signaling device can further comprise at least one light-emitting device. That is, the signaling section can comprise one or a plurality of light-emitting devices. Such light-emitting devices can be used to signal different status indications, intent, or other information to the surroundings of the signaling device and preferably of the mobile robot.

In some embodiments, the light-emitting device of the signaling section of the signaling device can be configured to improve at least one of passive and active visibility, salience, and conspicuity of a mobile robot by displaying at least one of the following static or dynamic information. This information can relate to color, brightness, symbols, text, patterns and/or images. In other words, the one or more light-emitting devices can emit light of different colors, of varying brightness and/or intensity, and/or animated in some way. If a plurality of light-emitting devices is present, they can emit information relating to symbols, text, patterns and/or images. That is, the signaling section of the signaling device can comprise a screen or a screen-like combination of light-emitting devices that can project information in a coordinated manner. Furthermore, this information can be static or dynamic. That is, the light-emitting devices can signal static information, for example a constant color, image, text, and/or symbol. This static information can change depending on the surroundings of the signaling device and preferably depending on the current or upcoming actions of the mobile robot. Additionally, or alternatively, the light-emitting device or devices can display animated information. That is, the light-emitting devices can project patterns, animated images, or motion illusions. This can be particularly advantageous for drawing attention to the signaling device and preferably to the mobile robot.

In one specific example, the signaling device can be attached to a mobile robot travelling on pedestrian walkways. It can be advantageous for such a robot to traverse road crossings. As there can be cars on those road crossings, this can be a particularly dangerous environment for the robot. In this case, it can be particularly desirable to emit an animated light signal via the light-emitting device or devices, to particularly draw the attention of the drivers on the road crossing and/or the mobile robot.

In some embodiments, the light-emitting device or devices preferably comprise at least one light emitting diode, more preferably a plurality of LEDs, even more preferably a plurality of LEDs arranged in a linear manner forming a line or an array of LEDs. In other words, the LEDs can also form a screen or a semblance of a screen for displaying text, images, or symbols. The LEDs can also simply form a line or an array for displaying different colors, patterns or simulate motion by turning on the LEDs at different times.

The signaling device can be controllable for different situations during operation of the robot. E.g., the signaling device can have 3 (essentially or exactly) flat or even in thickness arranged display areas that are radially arranged with respect to a longitudinal axis of the neighboring section of the elongated member, as already described before. Those can be provided with a 120° angle between neighboring display areas. At least one, preferably 6 LED(s) or any other number of LED(s), in each row are at least arranged in the signaling section to form a light-emitting device, preferably between the display areas in order to (additionally) illuminate the display areas. Such LEDs can be omnidirectional high intensity LEDs, preferably with at least one of light-emitting angle of at least 120° and/or a (maximum) power of at least 1 W.

The LED(s) can be configured to be controlled to provide at least one function of constant lighting, fading with at least 0.5 Hz according to transition functions, preferably a linear function, logistic function, sine function, cosine function, and/or absolute function, blinking with 1 Hz, flashing with at least 3 Hz, providing a dimmed function, preferably with an intensity of 3%, providing different levels of intensity, preferably normal intensity and/or high intensity. In case the maximum power of the LED is 1 W, the high intensity would make use of such maximum power.

The light-emitting device can comprise a lightproof core, preferably comprising a dark or black printed circuit board in order to provide a more integral structure to the viewer and/or to provide at least one effect of a dark background for the LEDs to hinder direct ambient light from shining through the light-emitting device, and/or to increase contrast and luminosity of the LED's illumination.

In some embodiments, the light-emitting device can be configured to create a plurality of light patterns to signal respective messages for each light pattern. For example, when at a road crossing, the light-emitting devices can turn on one after the other, thus simulating motion (particularly showing intent) or blink in a red color (particularly attracting attention). In another example, in embodiments where the signaling device is attached to a mobile robot, and said robot is a delivery robot, there can be a specific light pattern for the delivery transferring process. That is, once the robot arrives to the delivery recipient, the light-emitting devices can animate in a way as to indicate status or action to the delivery recipient, for example that the mobile robot is unlocked, and they should open it to access their delivery. This can be indicated by a downward simulated motion of the light-emitting devices, a certain color (for example green, so show that it is time to access the delivery), or a projected message of some sort.

In some embodiments, a signaling scheme can define the meaning of each light pattern created by the at least one light-emitting device. This can be a signaling scheme, that is understandable based on traffic norms, such as using the red color for "attention", the green color for signaling "all clear", or using motion simulated patterns to indicate the status or progress of a certain process.

In some embodiments, the signaling device can further comprise a power source and/or a control circuitry configured to at least one of supplying the at least one light-emitting device with power and controlling it. That is, the signaling device can comprise a power source configured to supply electrical energy to the signaling device, more particularly to the signaling section. The signaling device can further comprise a control circuitry that can be configured to control the signaling device, more particularly the signaling section. This can be a standard controller with wires coupled to the light-emitting devices.

In some embodiments, the signaling section of the signaling device can further comprise a display area comprising at least one of passive content and active content. As described above, the passive content can comprise a permanent or semi-permanent message or information displayed on the display area. For example, the signaling section can comprise a flag or a similar piece of material comprising a certain color, a logo, some text or images. Additionally, or alternatively, the signaling section can comprise an actual display that can project images, videos, text, symbols or varying logos. These can be constant (that is, the same information projected for a certain time, such as on the order of seconds to minutes), or they can be animated (that is, information changing with a relatively short interval on the order of milliseconds to seconds).

In some embodiments, the display area of the signaling section of the signaling device can be configured to improve at least one of passive and active visibility, salience, and conspicuity of a mobile robot by displaying at least one of the following static or dynamic information. This information can relate to color, size, brightness, text, symbols, and/or images. As previously described, the information can be displayed in the form of a flag with a logo, color, text, image or symbol, or it can be displayed on a display and change according to the situation. In some embodiments, the display area can comprise a reflexive coating. This can be particularly advantageous, as it can add visibility of the robot in conditions of reduced light without using an active source of illumination.

In some embodiments, the body section can comprise an elongated member. This elongated member can comprise a length in the range of 10 to 130 cm, more preferably 20 to 70 cm, more preferably 100 to 130 cm, a dimeter in the range of 5 to 12 mm, more preferably 7 to 9 mm and/or wall-thickness in the range of 0.5 to 2 mm. That is, the elongated member can be hollow or comprise an opening in the middle in some embodiments. This can be advantageous to leave space for any wires going from the base of the signaling device to the display area. The length of the elongated member can be advantageous to ensure that it is in the field of view of typical traffic participants such as pedestrians, drivers, bikers and so on. The diameter can be chosen in this range to ensure the sturdiness of the signaling device while also avoiding unnecessary bulk, weight or potential collision momentum.

The signaling device can comprises at least one telescoping section, preferably electrically driven and more preferably fixable in height. Thus, the signaling device can be adapted to visibility conditions, different legislations etc.

In some embodiments, the elongated member can further comprise reflexive coating. This can be advantageous for increasing visibility, salience and/or conspicuity of the signaling device and preferably of the mobile robot in the dark, twilight, fog, or cloudy weather conditions.

In some embodiments, the elongated member can further comprise at least one light-emitting device. That is, in such embodiments, the signaling device can also display information on the elongated member, and not just on the signaling section. This can be advantageous for an even increased visibility.

In a second embodiment, the invention discloses a system for increasing visibility of a mobile robot. The system comprises a mobile robot. The system further comprises a signaling device attached to the mobile robot. The signaling device is configured to at least one of increasing the visibility of the robot and providing some additional signaling means for the robot. The system further comprises a remote terminal configured to at least one of monitoring and controlling at least one of the mobile robot and the signaling device.

The present system can be particularly useful for mobile robots travelling outdoors. Such mobile robots can be using pedestrian walkways for travelling between destinations. In a specific example, such mobile robots can be used for delivering items to delivery recipients. The robots can be loaded with items at a first location and proceed to travel to a delivery location. While traveling, the robots can encounter various traffic participants such as pedestrians, drivers, and/or bikers. It can be desirable that such robots be visible to those traffic participants and that they potentially signal some intent to those traffic participants. Therefore, the signaling device attached to such mobile robots can be used to increase visibility, salience and/or conspicuity of such robots while also signaling in some way.

The remote terminal can comprise, for example, a remote server that can be adapted to communicate with the mobile robot, monitor its progress and its actions and potentially controlling it when needed. The remote terminal can also comprise a remote operator, that is, a person that is monitoring a robot and can interfere in case of safety concerns or in case of standard predefined conditions. Going back to the above example of a mobile robot traveling outdoors, the remote operator can control the robot as it is crossing a road to avoid unnecessary danger. The mobile robot can be configured to move autonomously in normal conditions, and to be controlled via a remote server or a remote operator in some more dangerous conditions (such as crossing the road). In such embodiments, the remote terminal can also give specific commands to the signaling device. Those commands can relate, for example, to specific signaling, such as projecting blinking red lights when crossing a road.

In some embodiments, the mobile robot can comprise power and/or control circuitry. In such embodiments, the power and/or control circuitry of the signaling device (if it is present) can be fully integrated with that of the mobile robot. In some other embodiments, the power source and/or control circuitry of the signaling device can be partially integrated with the power and/or control circuitry of the robot. That is, the two can be in communication and/or the mobile robot can be adapted to send commands to the signaling device. In some other embodiments, the power source and/or control circuitry of the signaling device can comprise a separate unit located inside the robot body. The three options can have different advantages. For example, a fully integrated control system can ensure fast command execution and a more centralized command center. On the other hand, a separate control system for the signaling device can provide redundancy in case of system failure and a self-contained block that can be quickly installed on one or another mobile robot.

In some embodiments, the signaling device or the body section can further comprise at least one light-emitting device LED(s) or HD LED(s), the remote terminal monitoring and/or controlling the robot can control the at least one light-emitting device of the signaling device and/or of the body section. For economic reasons, the body section can comprise LED(s) in order to better show the connection of the signaling device to the robot while the signaling device itself comprises HD LED(s). The first-mentioned set of LED(s) can be operated constantly while the latter-mentioned set of HD LED(s) can be controlled according to the different driving conditions of the robot.

For example, if, for some reason, the mobile robot needs to stop while travelling, the remote server or operator can command the signaling device to blink with a red light to indicate that it is stationary for a reason. Furthermore, the remote terminal can have the ability to override the current setting of the signaling device. This can be useful if there is a malfunction with its control, and the signaling that it is emitting does not align with the desired signaling.

In some embodiments, the signaling device can be configured to avoid obstacles that are at a height between the upper extreme of the robot and the upper extreme of the signaling device. For example, if a mobile robot detects an approaching obstacle at this height, it can command the signaling device to lower itself by rotation, or to otherwise get out of the way.

In some embodiments, the signaling device can be configured to bend under the influence of an external force. That is, if the mobile robot inadvertently collides with its surroundings or with traffic participants, the signaling device can be adapted to bend, so as to avoid injury to traffic participants and to avoid breaking. As mentioned above, this can also be desirable when the mobile robot enters small spaces that might otherwise not fit the signaling device.

In some embodiments, the signaling device can be configured to lower the impact of a collision with traffic participants, such as pedestrians, by comprising a flexible component. As described above, the signaling device can be adapted to bend on collisions instead of staying upright or substantially upright, therefore reducing the possibility of inflicting harm upon pedestrians or other traffic participants. The signaling device can be configured particularly to increase eye safety of pedestrians and/or animals in case of unintended collisions. For example, in addition to flexibility in the base section, the very top of the signaling device can be manufactured so as to be blunt. The signaling device can also be adapted to be lowered down, so as to pass through smaller openings and/or spaces or avoid collisions.

In some embodiments, the mobile robot can be configured to travel on pedestrian walkways. That is, the robot can be manufactured to be small enough to comfortably fit on pedestrian walkways, to travel with a speed not substantially exceeding that of pedestrians, and to comprise a sensor system necessary to avoid collisions with and inconveniences to the other users of pedestrian walkways. The advantages can be that the mobile robot can access areas not accessible to vehicles, avoid most of traffic and quickly travel between desired destinations.

In some embodiments, the signaling device can be configured to display at least one of passive and active content when the mobile robot is traversing a road crossing, said passive or active content different from the content displayed otherwise. That is, the signaling device can be adapted to display certain content specific to a road crossing. For example, this can be a red blinking to draw the attention of drivers. In this case, passive content can comprise a constant red signal emitted by the signaling device. Active content can comprise simulated motion such as blinking, or another animation emitted by the signaling device.

In some embodiments, the mobile robot can comprise at least one further signaling component, preferably at least one further light emitting component and wherein this further signaling device is adapted to signal in concurrence with the signaling device. For example, the mobile robot can comprise front lights, back lights, or lights inbuilt into the top surface of the mobile robot. In this embodiment, those lights can emit coherent information together with the signaling device. For example, in case the mobile robot is a delivery robot, it can comprise a lid that the delivery recipient should open to access the delivered item. The lid can then comprise integrated light emitting components. Once the robot arrives to the delivery recipient's location, the signaling device can display an animation pointing towards the lid of the mobile robot, and the light emitting components can continue this animation, pointing towards the place where the robot should be opened. Additionally, or alternatively, when crossing the street, the robot can increase its visibility, salience and/or conspicuity by not only signaling via the signaling device, but also signaling with another signaling component such as the front, back, side, or lid lights.

In some embodiments where the mobile robot can be configured to deliver items to delivery recipients, the signaling device can be further configured to signal during the transferring of an item from the mobile robot to the delivery recipient. This can be as described above, wherein the signaling device can point the delivery recipient towards the opening of the lid. This can also be used to indicate to the delivery recipient that the robot is ready to be opened, or that some operation (such as the unlocking of the lid) is loading.

In some embodiments, the signaling device can further comprise a microphone configured to facilitate communication between at least two of traffic participants, the mobile robot and/or the remote terminal. That is, the microphone can be located at the top of the signaling device, preferably at or around the highest point of the mobile robot. In some embodiments, the signaling device can comprise a plurality of microphones, such as an array of microphones. This can be particularly advantageous to achieve or facilitate at least one of the following: locate pedestrians, vehicles, bicycles or other traffic participants, improve localization of the mobile robot, filter acoustic noise while receiving ambient sounds, improve speech understandability, improve speech recognition quality.

Note, that as used herein, the terms autonomous or semi-autonomous robot can be used to mean any level of automation depending on the task that the robot is performing. That is, the robot can be adapted to function autonomously or semi-autonomously for most of the tasks but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals.

The present invention also relates to a system and/or a method of operating a robot with a signaling device according to the operation conditions or driving conditions of the robot. The respective method steps can comprise the steps of providing at least one LED, and/or HD LED(s), in or at one of a signaling section and/or an elongated member that is configured to support the signaling section with respect to the robot; and controlling the LED(s) in at least one of the following manners:

i. to switch the LED(s) off while the robot is idle or not in use
ii. to dim the LED(s) while stopping the robot on walkways, preferably with a light intensity of 3% of the LEDs; and/or
iii. to dim and/or to fade the LED(s) while moving the robot drives on walkways, preferably with a light intensity between 3-20% of the LEDs and a frequency of 1 Hz; and/or
iv. in a road crossing mode
  1. to flash with a first frequency and/or to fade and/or to spin when the robot is preparing and/or waiting before crossing the road, preferably with a frequency of 1-2 Hz and preferably with a light intensity of 3-30% of the LED(s),
2. to flash with a second frequency when the robot is crossing the road, preferably with a frequency of 3 Hz
3. to flash with a third frequency that is higher than the first frequency when during road crossing of the robot a potential danger is detected by the robot, preferably with a frequency of 5 Hz.

This can preferably assist a spectator or automated image recognition to intuitively or better understand the present and/or next status of the robot.

BRIEF DESCRIPTION OF THE DRAWINGS

The drawings shown and described below serve for illustration purposes only. They illustrate only specific embodiments of the invention and do not intend to limit the scope of the present teachings in any way.

FIG. 5 shows a cross sectional view of the spring covered in plastic in the base assembly, FIG. 6 shows a detailed view of the hinge assembly, FIG. 9 shows an embodiment of a mobile robot in communication with a remote terminal, FIG. 10 depicts an embodiment of display areas of a signaling section according to the present invention, FIG. 11 an alternative or additional structure or embodiment of inventive display areas, and FIG. 12 a top view onto a signaling section with three display areas and a holding and/or illumination structure in the middle

DETAILED DESCRIPTION

In the following, exemplary embodiments of the invention will be described, referring to the figures. These examples are given to provide further understanding of the invention without limiting its scope.

Figure 1:
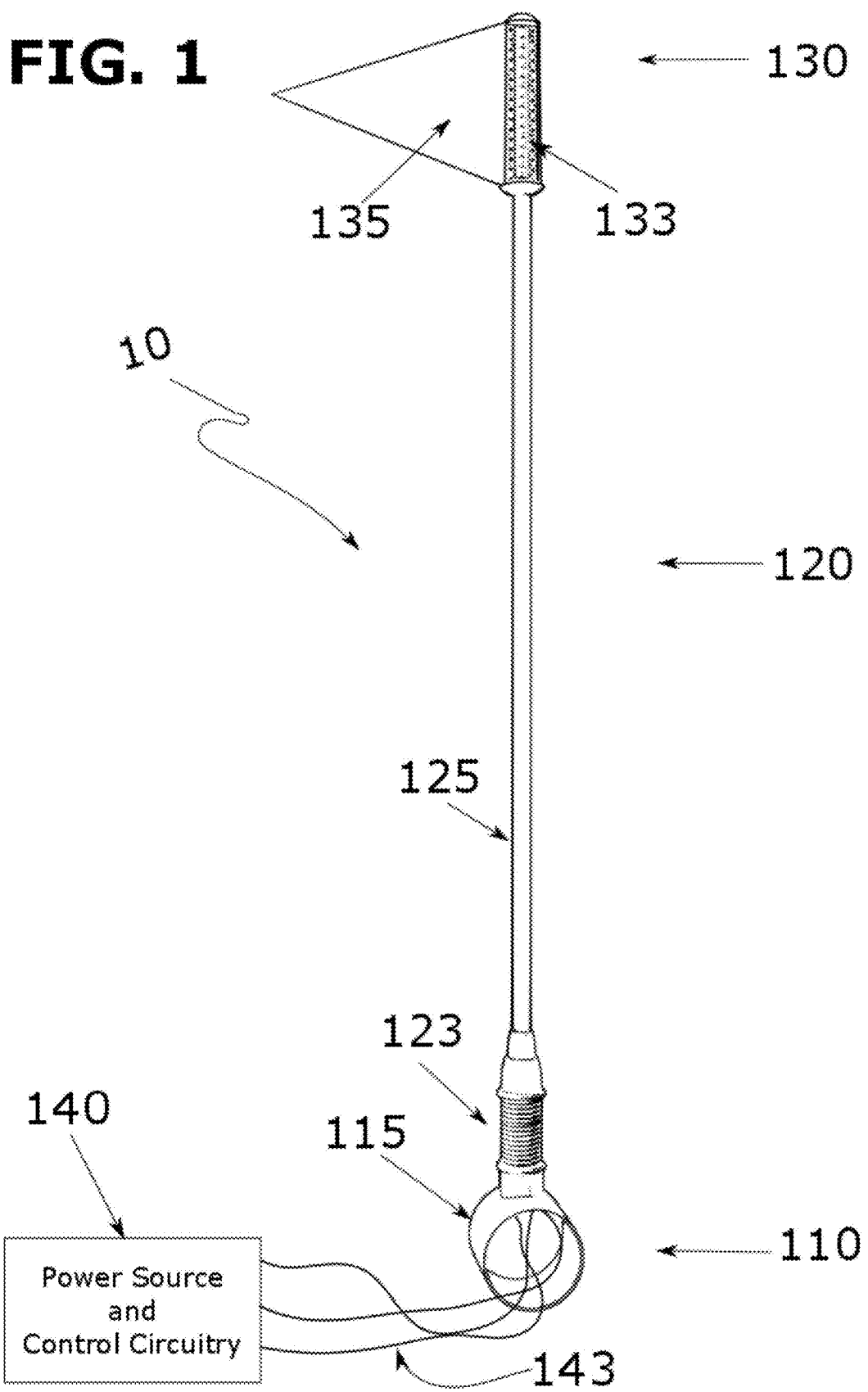
FIG. 1 shows an embodiment of the signaling device according to an embodiment of the invention.

In FIG. 1 an embodiment of a signaling device for increasing visibility of mobile objects according to one aspect of the invention is shown. The depicted embodiment of the signaling device 10 comprises four sections: the base section 110, the body section 120, the signaling section 130 and the power source and control circuitry 140. The body section 120 is flexibly jointed to the base 110 in the lower extreme and is jointed with the signaling section 130 in the upper extreme in a firm manner. The base section 110 can be adapted to attach the embodiment of the signaling device 10 to a mobile object (not depicted in FIG. 1), providing means of rotation according to the plane of the surface of attachment (refer to description of FIG. 2 for a clearer understanding). In this embodiment, the power source and control circuitry 140 is shown separated from the other sections 110, 120, 130. The power source and control circuitry are connected to the signaling devices located in the signaling section 130 by means of flexible wires 143. The body 120 and base 130 are adapted to allow wires 143 to pass through them e.g. the members of the body section 120 and base section 130 comprise a hollow space.

Figure 2:
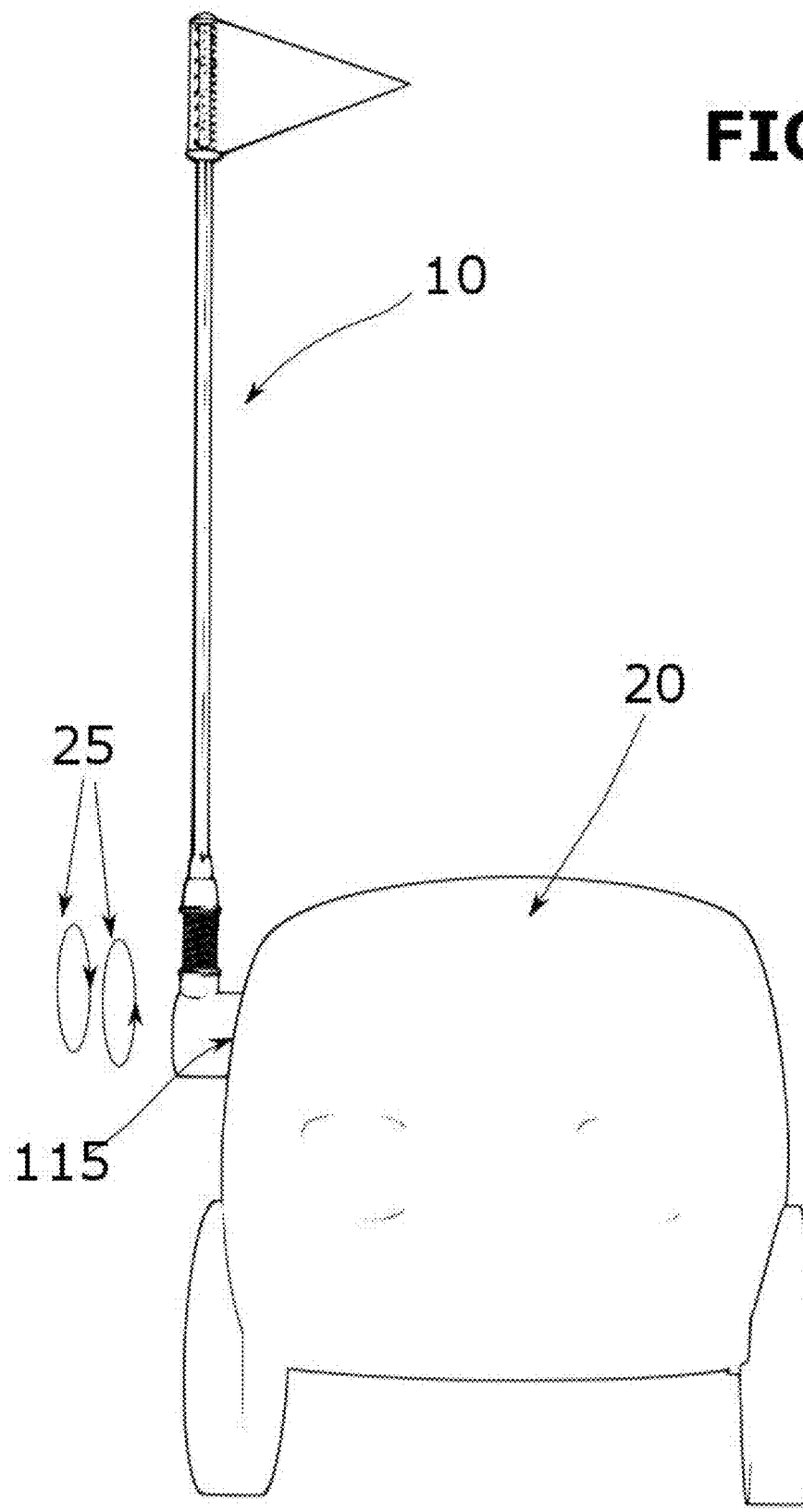
FIG. 2 shows an embodiment of the signaling device in a straight position attached to a mobile robot.

Referring now to the embodiment of the signaling device 10 in general, shown in FIG. 1, preferred functions of the device are signaling and increasing the visibility of an autonomous, semi-autonomous or non-autonomous mobile robot (not shown in FIG. 1). For this reason, in an embodiment, the device 10 would extend upward from the mobile object it is attached to, to the height of an average person, or to the peripheral or foveal field view of an average person or traffic participant. Thus, in a preferred embodiment according to the invention, the device 10 would have a height between 50-140 cm. Such a preferred embodiment is shown in FIG. 2. The embodiment of the invention 10 is attached to the mobile robot 20.

The mobile robot can be an autonomous, semi-autonomous or non-autonomous mobile robot. In a preferred embodiment, the mobile robot 20 is a mobile robot. The mobile robot can move autonomously or semi-autonomously among traffic participants. For this reason, the mobile robot can have means of increasing its visibility, so it can be noticed by the pedestrians. This need is fulfilled by the embodiment of the signaling device 10.

Referring now to FIG. 2 in more details, an embodiment of the signaling device 10 in a straight position attached to a mobile robot 20 is shown. More preferably, the mobile robot 20 can be a wheeled robot driving autonomously or semi-autonomously among traffic participants. In another preferred embodiment, the wheeled robot 20 can be a delivery robot delivering goods and/or packages to their destination. In an embodiment, the mobile robot 20 may have a height of 30-100 cm. The height of the device according to the signaling device 10 may be dependent on the height of the mobile robot 20 so as to achieve a total height approximately equal to the height of an average human, or a height placing the mobile robot in the peripheral or foveal field of view of a person or of other traffic participants. In a preferred embodiment as depicted in FIG. 2, the signaling device 10 can be attached to one of the sides of the wheeled robot 20, preferably in one of the upper corners of one of the sides. In a preferred embodiment, the joint 115 between the signaling device 10 and the wheeled robot 20 allows rotation of the signaling device 10 in the direction depicted by the arrows 25. It should be noted that the arrows are not part of any embodiment of the invention, they are just included in the drawing for illustration purposes only.

Figure 3:
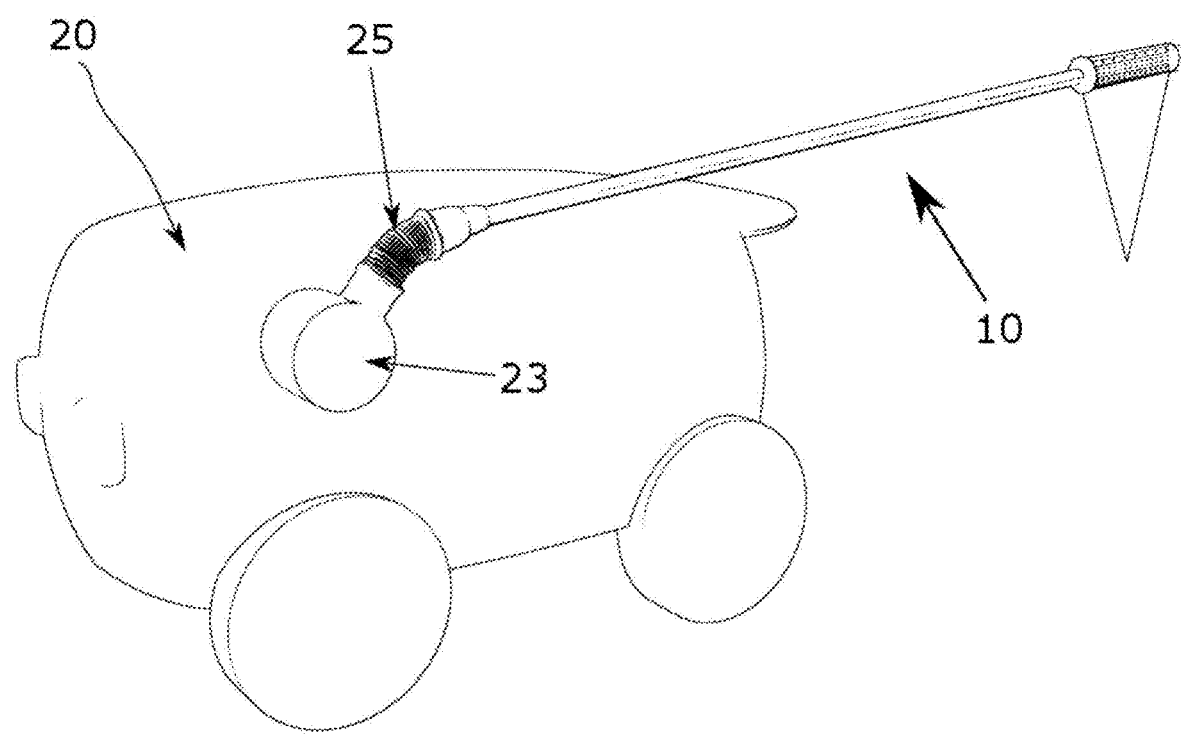
FIG. 3 shows an embodiment of the signaling device in a bend position attached to a mobile robot.

FIG. 3 illustrates an embodiment according to the invention similar to the one depicted in FIG. 2, but in this situation, the signaling device is bent towards the ground. This bend is caused by an external force not shown in the figure. This force may be produced by different external sources. Some examples are described below. As the mobile robot 20, preferably a mobile robot, drives in different areas, it may encounter obstacles on its way, which are at the height between upper extreme of the mobile robot 20 and the upper extreme of the signaling device 10. In such situations, the robot does not have to change its path, but in contrary it can continue on its path. So logically there will be a collision between the flagpole 10 and the obstacle encountered. If no flexibility means would be implemented on the signaling device 10, either the flagpole 10 and/or the robot 20 and/or the obstacle would be damaged. Another situation can be collision with pedestrians. In some situations, pedestrian can accidentally collide with the robot 20 and thus encounter the flagpole. To avoid hurting the pedestrians, and/or damaging the moving robot 20 containing the signaling device 10, or the signaling device 10 itself, flexibility means are introduced and designed into the embodiment according to the invention. The bending and the flexibility means of the signaling device 10 are made possible by the rotational joint 115 between the mobile robot 20 and the signaling device 10, the flexible joint 123 between hinge 115 and the elongated member 125 of the signaling device 10 and the material and structure of the elongated member 125.

Referring now particularly to the elongated member 125 of the signaling device 10, shown in FIG. 1, the elongated member 125 serves as a flagpole to hold the signaling members of the embodiment of the invention straight upwards at a height similar to the height of humans, so that the mobile robot 20 (shown in FIG. 3) that the device 10 can be attached to can be easily noticed. It should be noticed, for the sake of illustration, that the elongated member 125 refers to the part of the device 10 between the upper extreme of flexible member 123 and the lower extreme of light-emitting devices 133. The elongated member 125 may have a length of 90-160 cm according to one preferred embodiment of the invention. In a preferred embodiment, the elongated member 125 may have a diameter of 5-12 mm. In a preferred embodiment of the invention, the elongated member 125 may have a hollow shape so that to encapsulate the wires 143 connecting the power source and control circuitry 140 to the signaling section 130. In a preferred embodiment, the elongated member 125 may have wall thickness in the range 0.5-2 mm. The material of the elongated member should, on one hand be rigid enough to be able to support its own weight and be hard to break and, on the other hand be flexible enough to guarantee pedestrian safety, in case pedestrians accidentally collide with the mobile object 20 shown in FIG. 3. Stiffness or rigidity of a material is defined as:

$$k = \frac{F}{\delta}$$

where k is the stiffness of the material (here: the material of the elongated mast 125), F is the force applied on the body (here: the body refers to the elongated member 125) and δ is the displacement produced along the same degree of freedom (DOF) i.e. the displacement along the direction of the applied force F of the point where the force is applied. In the context of the present invention, the elongated mast 125 should be able to withstand a force F as big as possible and at the same time be flexible, thus having a displacement δ as big as possible. These are clearly conflicting requirements, therefore, the choosing of the stiffness of the material is a trade-off between the rigidity of the elongated mast and its flexibility.

A preferred material for constructing the elongated member 125 can be carbon fiber. Benefits of carbon fiber material are that it is rigid enough, it can bend to a convenient range without breaking, and it makes the signaling device 10 lightweight. This preferred material for the elongated member 125 makes it safe for the pedestrian that may accidentally collide with it or for the obstacles it may be in contact with.

Figure 4:
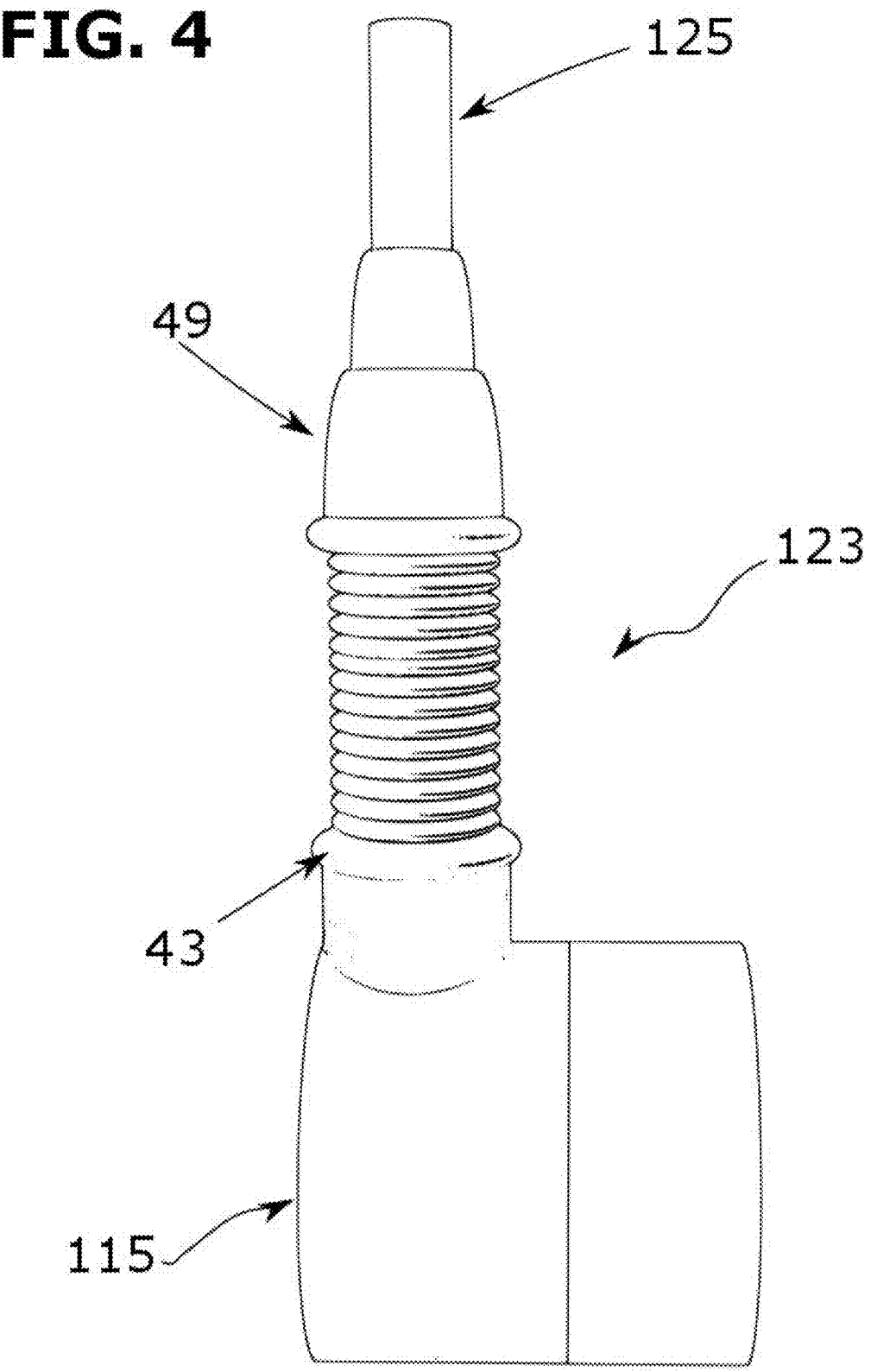
FIG. 4 shows an enlarged view of the base assembly.

The flexible element 123 of the signaling device 10 according to one of the embodiments shown in FIG. 1 is now discussed. A preferred design of this flexible element 123 is shown in more detail and in an enlarged view in FIG. 4. Referring to FIG. 4, the elongated member 125 can be attached to the hinge 115 by the flexible member 123. The flexible member 123 can be attached to the hinge 115 with a rigid joint 43 and is rigidly attached to the elongated member 125 with the help of the telescopic structure 49. The telescopic structure can be needed since the diameter of the flexible element 123 may be bigger than the diameter of the elongated member 125. In a preferred embodiment according to the invention, the flexible material 123 can be a spring, such as a helical spring, covered by an outer layer. The structure of the preferred embodiment of the flexible material 123 is shown in more detail in FIG. 5 where a cross-sectional view of the spring cut by a plane perpendicular to the spring axis is depicted. From this point of view, it is depicted more clearly that the spring 55 can be positioned in the center and covered by the plastic material 53, indicated by a thick circle in the figure for illustration purposes only. In a preferred embodiment, the plastic material 53 can be a heat shrinking tube. When starting the manufacturing process, this heat shrinking tubing 53 can have a diameter slightly bigger than the outer diameter of the spring, e.g. the diameter of the shrinking tube may be 0.5-2 mm bigger than that of the spring. Similarly, the heat shrinking tube may have a length slightly longer than the spring. Next step of the process is to position the spring 55 inside the heat shrinking tube 53 so that the spring 55 is covered in its whole length. Final step is to slowly heat the shrinking tube. The material of the heating tube would react to this slow heating by shrinking and thus enveloping the spring 55. Using this process, the spring 55 can be fully covered, and a fixed attachment can be created between the cover plastic material 53 and the spring 55.

The embodiment of the flexible member 123 comprising the spring 55 enveloped by an outer layer 53 introduces many benefits. First, it provides the signaling device 10 with flexibility means. In cases when external forces are applied at a direction not parallel to the axis along the signaling device 10, the spring 55 would bend. One example of this situation is the case when a mobile robot 20 encounters an obstacle which is at a height between the upper extreme of the robot 20 and the upper extreme of the signaling device 10. In such a situation, the robot does not need to change its path. It can continue to drive toward the obstacle. The moment the signaling device 10 makes contact with the obstacle, the spring 55 would start bending as shown in FIG. 3. Due to this bend, the signaling device 10 would smoothly slide under the obstacle not damaging the robot 20, itself, or the obstacle. The same situation can occur in case a pedestrian accidently collides with the robot 20. Due to the flexibility of the spring 55, the signaling device 10 would smoothly bend in the direction forced by the pedestrian, lowering the contact force between the pedestrian and the signaling device 10. Another benefit of the assembly of the flexible member 123 is the shaking robustness it gives to the signaling device. The flexibility of the spring 55 is required in cases of obstacle avoidance, but it can have the side effect of making the signaling device 10 shake back-and-forth as the mobile object 20 moves. The outer layer of the spring can help in damping these oscillations, since it makes the spring 55 more rigid. Furthermore, this assembly of the flexible material 123 creates more degrees of freedom in choosing the right spring for the device 10 (that is, the spring with the correct spring constant for example). Thus, it simplifies the process of assembling the device to a certain degree.

Referring now to FIG. 6, a preferred embodiment of the hinge 115 (shown in FIG. 1) is shown. The hinge 115 comprises two members 610 and 630. Element 610 is rigidly joined with the mobile robot 20 (shown in FIG. 2) on the side opposite to the one shown in FIG. 6, while element 610 is rigidly joined with the flexible material 123 (shown in FIG. 4). Element 630 is mounted on element 610 in such a way, that the cylinder-shaped component 639 is inserted on the hollow part 615. Components 610 and 630, once mounted, will not separate from each other, unless a significant force is applied, similarly to the way the back lid of the cellphone does not separate from the cellphone. The parts 610 and 630 are designed and shaped in such a way as to allow element 630 to rotate clockwise and anticlockwise with respect to the fixed element 610. This rotation can be guided by means of a torsion spring 670. The torsion spring 670 is put between elements 610 and 670 before mounting them. The torsion spring 670 would lie on the hollow 613 on element 610 and on hollow 633 of element 630. One of the legs 671 of the torsion spring 670 would lean against the supporting part 637 in one of its sides, and the other leg 673 would be supported by one of the sides of supporting element 617. The spring assembled in such a way would allow element 630 to rotate in clockwise and anticlockwise direction with respect to the fixed element 610 under the effect of an external force, similar to that previously described for bending the flexible material 123. At this moment, the torsion spring 670 is twisted and thus it would exert a force in the opposite direction of the external force. As soon as the external force stops acting, the torsion spring 670 would tend to go to its equilibrium position. Since element 610 is rigidly fixed to the body of the mobile robot, the tendency of the torsion spring 670 to go to the equilibrium position would rotate element 630, which is rigidly joined to the rest of the signaling device 10, in a direction opposite to the one forced by the external force returning the signaling device 10 to a vertical or substantially vertical position. This mechanism adds an extra layer of flexibility to the signaling device 10 in terms of avoiding obstacles and pedestrian safety to the flexibility measures described above. A torsion spring 670 with a low spring constant would twist more easily i.e. a weak force would be able to twist it. A "strong" torsion spring 670 with a high spring constant would require a larger external force to bend. This is explained by the Hooke's Law shown below:

$$\tau = k \cdot \theta$$

where $\tau$ denotes the torque created by the external force, k is the spring constant (also rate, torsion coefficient) and $\theta$ is the angle of twist of the torsion spring 670 from the equilibrium position. In this context, it can logically be understood that choosing a torsion spring 670 with a large spring constant k would damage the joint between element 610 and the mobile robot 20, but it would damp the oscillation of the signaling device 10 faster. On the other hand, choosing a lower spring constant torsion spring 670 would be safer for the joint between element 610 and the mobile robot 20, but the signaling device 10 could oscillate. The flexibility means designed in the material of the elongated member 125 (shown in FIG. 1) and in the flexible material 123, makes it possible to choose a moderately high constant spring for the torsion spring 670. Another thing to notice about FIG. 6 is the hollow shape of cylinders 639 and 636. They are designed in such a way as to allow the wiring 143 between the power source 140 and the signaling section 130 pass through the hinge (refer to the description corresponding to FIG. 1). In such an embodiment, the wiring 143 would go into the cylinder 636, then pass through hollow 635 directly into hollow 615. Joint between element 610 and mobile robot 20 may have a hole to allow the wires to enter into the mobile robot 20. In such an embodiment, the power source and control circuitry 140 for the signaling section 130 is positioned inside the mobile robot. In another embodiment, the power source and control circuitry 140 may not be related to the mobile robot 20. In such an embodiment, the joint between mobile robot 20 and element 610 would not contain any hole. The hollow would be positioned somewhere in the side walls of element 610. In any case, in preferred embodiments, there is a hollow to allow the wires to pass through the hinge and connect to the power source.

Figure 7:
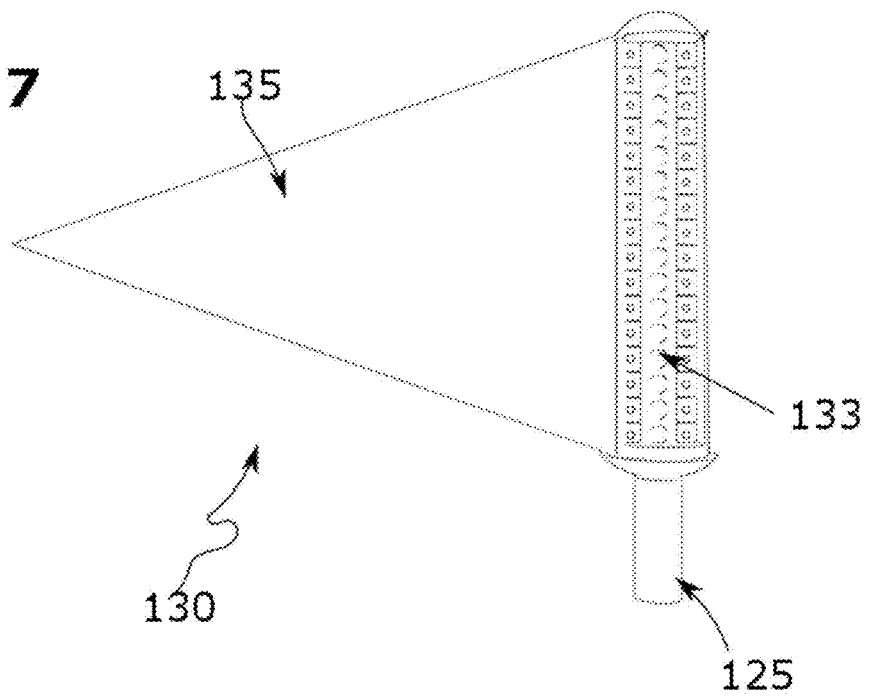
FIG. 7 shows an enlarged view of the signaling means.

FIG. 7 shows an enlarged view of the preferred design of the signaling section 130 for the embodiment according to the invention shown in FIG. 1. The signaling section 130 in an embodiment can be rigidly attached to the upper extreme of the mast 125. In a preferred embodiment, the signaling section 130 can be positioned at a height equal to an average height of humans, or at least in the peripheral or foveal field of view of average humans or other traffic participants. In a preferred embodiment, the signaling section 130 comprises elements that are adapted to improve visibility through raising salience or conspicuity (i.e., grabbing attention). In a preferred embodiment, the signaling section 130 would be comprised of a display area 135, which can be passive or active, and at least one light-emitting device 133. In a preferred embodiment, the display area 135 is a flag and comprises lightweight material. Some examples of the materials for the display area 135 are plastic, rubber, fabric etc. In a more preferred embodiment, the display area 135 comprises a rigid lightweight material. The display area 135 can comprise different colors and it may or may not include one or more characters, images, and/or logos in it. The display area 135 can have different shapes and sizes. In a preferred embodiment, the display area 135 is of triangular shape. The display area 135 may comprise passive and/or active content. The display area 135 may be used for advertising purposes and/or it may be used for uniquely identifying the mobile robot 20.

Referring now particularly to the at least one light-emitting devices 133, in a preferred embodiment, the at least one emitting devices 133 comprise light emitting diodes (LED). In a more preferred embodiment, the signaling section 130 comprises a plurality of LEDs on each side. This preferred embodiment is depicted in FIG. 7. The LEDs 133 are connected to the power source and control circuitry 140 through wires 143 passing through the hollows of the elements of the signaling device 10. The LEDs 133 can be controlled to produce a wide range of colors, i.e. RGB (red, green, blue) components can be combined to produce a wide range of colors. The LEDs 133 can produce different levels of brightness. In combination, the LEDs 133 can display static and/or animated patterns, i.e. differing in color, size, brightness, motion, flashing, and stimulus duration. In a preferred embodiment, the stream of LEDs 133 can be controlled to operate in different modes. In the following, such examples are shown. It should be noted that these examples are shown for illustration purposes and do not tend to limit the scope of modes of operation of the LEDs 133.

One example of operation is to turn the LEDs 133 ON sequentially in an upward direction to indicate that the mobile object is moving or intending to move. The speed of such an animation can be proportional to the speed of the mobile robot 20. In another example, in case the mobile robot 20 is a delivery robot, the LEDs 133 can be programmed to show a certain animation. For example, when the delivery robot 20 reaches the delivery recipient, the LEDs 133 can light up sequentially so as to show a downward animation, indicating to the delivery recipient to retrieve the delivery from the delivery robot 20. In another example, the LEDs can light up with a solid color to indicate that the mobile robot 20 is staying still. In another example, the LEDs 133 can increase their intensity to warn other traffic participants. In another example, the LEDs can light up with a specific color to indicate whether the mobile robot 20 is in autonomous mode, semi-autonomous mode or non-autonomous mode. In another example, relating to a case when the mobile robot 20, preferably a mobile robot 20, is completing a task, the lower LEDs can be turned ON to indicate the percentage of the task completion. As the task approaches completion, more and more LEDs in the upward direction can turn ON to indicate an increase of the percentage of completion. In another example, the LEDs 133 can support the mobile robot's 20 human speech through light patterns. In yet another example, the LEDs can flash in red color to indicate a mechanical problem of the mobile robot 20. Depending on the type of the mobile robot 20, the modes and/or patterns of the LEDs can be different. Furthermore, the control circuitry 140 can be programmed to produce different or more LED modes.

Figure 8:
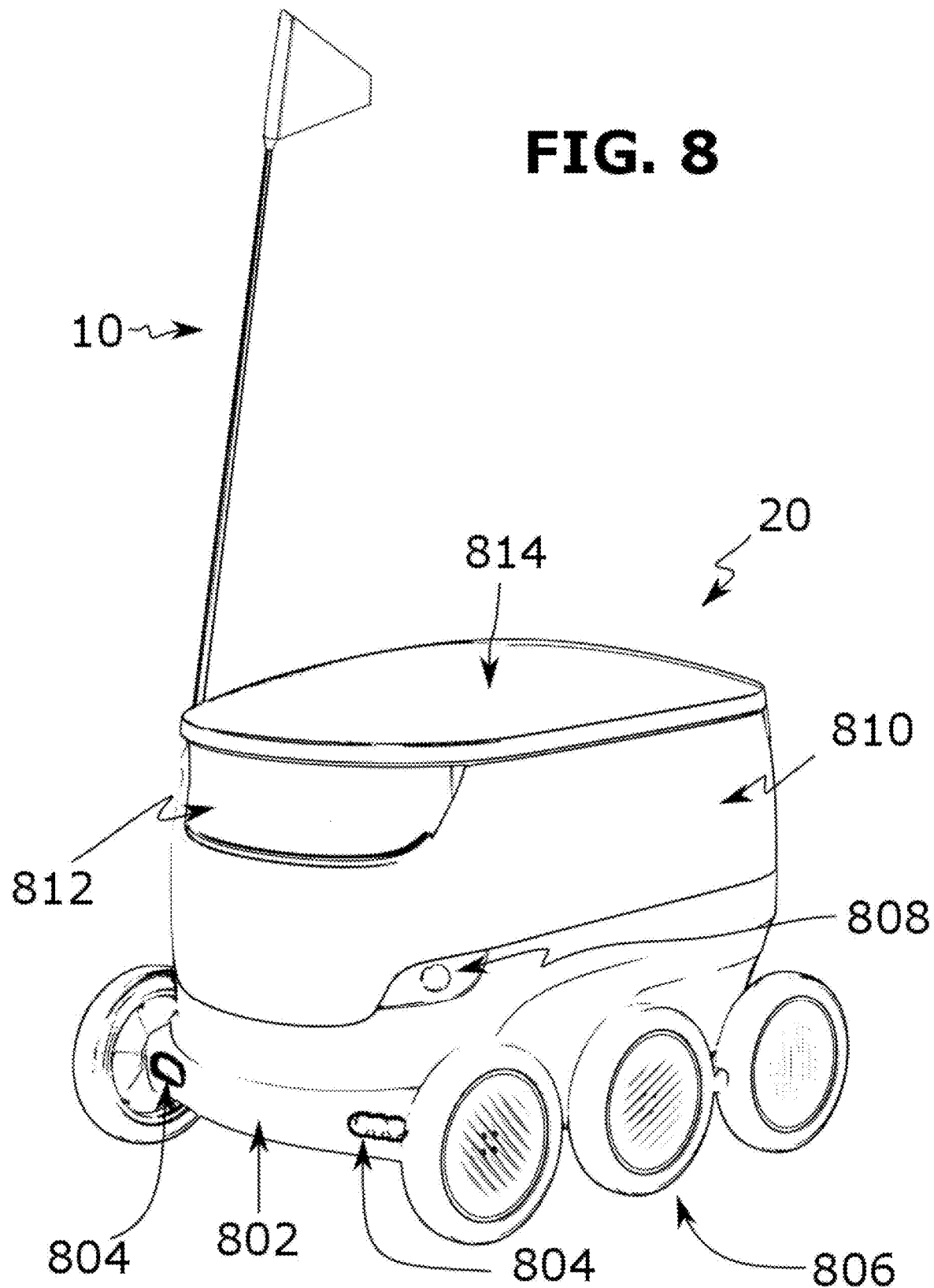
FIG. 8 shows an embodiment of a mobile robot where the signaling device can be used.

Referring now in more detail to the mobile robot 20, in a preferred embodiment the mobile robot 20 is a mobile robot 20. In an even more preferred embodiment the mobile robot, is a delivery robot 20 delivering goods to respective addresses. Such a preferred embodiment is depicted in FIG. 8, which illustrates a delivery robot 20 comprising the signaling device 10. The delivery robots 20 may be autonomous or semi-autonomous robots 20. One exemplary embodiment of a robot 20 is depicted in FIG. 8. The robot 20 may comprise a frame 802 and wheels 806 mounted to the frame 802. In the depicted embodiment, there are provided a total of 6 wheels 806. The robot 20 also comprises a body or housing 810 comprising a compartment adapted to house or store the goods to be delivered to the addressee. This compartment may also be called a delivery compartment. The body 810 may be mounted on the frame 802. The robot 20 also typically comprises a lid 814 for closing the body or housing 810. That is, the cover 814 may assume a closed position depicted in FIG. 8 and an open position. In the closed position, there is no access to the goods in the delivery compartment of the body 810. In the open position of the cover 814 (not depicted), the addressee may reach into delivery compartment of the body 810 and obtain the goods from the inside of the body 810. The robot 20 may switch from the closed position to the open position in response to the addressee performing an opening procedure, such as the addressee entering a code or the addressee otherwise indicating that he/she is in a position to obtain the goods from the robot 20. For example, the addressee may access the delivery compartment by using a smartphone application or the lid 814 may be automatically opened once the delivery location is reached by the robot 20. The robot 20 may also comprise one or a plurality of sensors 812, 808, e.g., cameras, to obtain information about the surroundings of the robot 20. The robot 20 may also comprise lights 804, such as LEDs.

Typical dimensions of the robot 20 may be as follows. Width: 20 to 100 cm, preferably 40 to 70 cm, such as about 55 cm. Height (excluding the signaling device 10): 20 to 100 cm, preferably 40 to 70 cm, such as about 60 cm. Length: 20 to 120 cm, preferably 50 to 80 cm, such as about 65 cm. The weight of the robot 20 may be in the range of 2 to 50 kg, preferably 5 to 40 kg, more preferably 7 to 25 kg, such as 10 to 20 kg.

The signaling device 10 may extend to an overall height of between 100 and 250 cm, preferably between 110 and 200 cm, such as between 120 and 170 cm. Such a height may be particularly advantageous such that the signaling device 10 and thus the overall robot 20 is easily seen by other traffic participants. In such an exemplary embodiment as depicted in FIG. 8 the signaling device 10 is attached in the front part of the robot 20, more specifically in the upper front corner of the delivery robot 20. Furthermore, the power source and/or control circuitry 140, that supplies with power and/or controls the light-emitting devices 133 of the signaling device 10 may be positioned inside the mobile robot 20. In another exemplary embodiment, the said power source and/or control circuitry 140 may be integrated in the circuitry (not shown) of the delivery robot 20 and the signaling device 10 and mobile robot 20 may share the same power source (not shown). In yet another exemplary embodiment, the power source and/or control circuitry 140 may be partially integrated in the circuitry of the robot 20.

In another embodiment, the robot 20 comprising the signaling device 10 may be part of a system where at least one remote terminal 90 controls at least one robot 20 comprising the signaling device 10. Such a system is depicted in FIG. 9, where for simplicity of understanding only one remote terminal 90 and one robot 20 comprising the signaling device 10 are depicted. It should be understood, that in reality there may be a plurality of robots 20 and remote terminals 90. The remote terminal 90 can monitor the robot 20 comprising the signaling device 10 and potentially may assume control of it. Thus, such a system depicted in FIG. 9 comprises bidirectional communication means, indicated schematically by the double arrows 902, between the robot 20 comprising a signaling device 10 and the remote terminal 90. In such an embodiment, the control circuitry 140 of the signaling device 10 is integrated or partially integrated in the circuitry of the robot 20 in a way that the remote terminal 90 can control the light-emitting devices 133 of the signaling device 10 using the bidirectional communication means 902.

In another embodiment, the signaling section 130 may further comprise a microphone, not shown in any of the figures. The mobile robot 20 can then receive ambient sounds with the microphone. In the example where the mobile robot 20 comprises a delivery robot, the microphone can be used to communicate with the delivery recipient. Otherwise, the microphone can be used to communicate with pedestrians and/or traffic participants. As the robot 20 can be semi-autonomous, there can be a remote operator 90 monitoring the robot 20, and potentially assuming control of it. In such embodiments, the remote operator 90 can then hear the surrounding environment with the help of the microphone. As the robot 20 can be autonomous, the microphone can be used to improve voice recognition quality. This microphone would be even more useful is when communicating with the pedestrians, since the signaling section 130 can be at the height of humans, and the sound of them would be captured clearer and louder by this microphone. In another embodiment, a camera may be included in the signaling section 130. In yet another embodiment, the signaling section 130 may comprise multiple microphones such as an array of microphones. This can allow the signaling device 10 to: locate pedestrians, vehicles, bicycles or other traffic participants, improve localization of the mobile robot 20, filter acoustic noise while receiving ambient sounds, improve speech understandability, improve speech recognition quality etc.

FIG. 10 depicts projective views of two examples of display areas 135' having a shape that can be better recognized by a human inspector or traffic participant or automated image recognition. The shape basically corresponds to a triangle. However, an outer corner 137 is located in the upper part of the triangle or in the upper visual or optical center of gravity. This is at least in the upper part of the projection of each display area 135'. One or each of the two edges 138 and 139 connecting the outer corner 137 of the display area 135' or flag 135' with a central edge 136 can be convexly shaped in order to further increase salience of the display area 135'. The central edge 136 is straight and in reality, connected to a central part of the elongated member or an elongation thereof preferably comprising LED(s) and/or HD LED(s).

FIG. 11 shows an embodiment of a display area or flag having a central part 135" and a circumferential part 135''' that has a different structure, color and/or visual appearance etc. The circumferential part is white and/or reflective/retroreflective and preferably both. This further enhances the salience particularly at night.

FIG. 12 shows an upper view onto the signaling section having three (3) display areas 135' being equiangularly spaced with an angle α. In the middle, a lightproof core 133' is provided that is preferably comprising a dark or black printed circuit board, to provide at least one effect of a dark background for the LEDs and/or to hinder direct ambient light from shining through the light-emitting device, and/or to increase contrast and luminosity.

Whenever a relative term, such as "about", "substantially", or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

We claim:

1. A device configured with a mobile robot comprising:
   (a) a base section, attached with a rotational joint to a side of the mobile robot, said rotational joint allowing the device to rotate clockwise and/or anticlockwise relative to the mobile robot, the rotational joint constructed and adapted to passively return the device to an equilibrium position; and
   (b) a body section comprising a mast, the body section flexibly attached to the base section at a lower extreme of the body section.

2. The device of claim 1, wherein the rotational joint allows the device to rotate clockwise and/or anticlockwise with respect to an axis perpendicular to a surface of the rotational joint between the device and the mobile robot.

3. The device of claim 1 further comprising:
   (c) a signaling section at an upper portion of the body section, wherein the signaling section comprises at least one display area.

4. The device of claim 3 wherein at least one of the signaling section and the body section of the device further comprises at least one light emitting device (LED) and/or at least one high-intensity LED.

5. The device of claim 4, wherein the at least one light emitting device comprises a plurality of LEDs arranged in a linear manner forming a line and/or array of LEDs.

6. The device of claim 4, wherein the at least one light emitting device is configured to create a plurality of light patterns to signal respective messages for each light pattern.

7. The device of claim 3, wherein the at least one display area has a projected surface of at least 90 cm$^2$.

8. The device of claim 3, wherein the at least one display area has a projected surface of at least 150 cm$^2$, more preferably 200 cm$^2$, even more preferably at least 300 cm$^2$, most preferably around 360 cm$^2$.

9. The device of claim 1, wherein the base section comprises a flexible component configured to bend when an external force acts on the device when the device is attached to the mobile robot.

10. The device of claim 9, wherein the flexible component comprises a spring configured to bend when the device is under influence of an external force when the device is attached to the mobile robot, and wherein the spring has a spring constant of 5 to 20 N/mm, preferably of 10 to 15 N/mm.

11. The device of claim 1, wherein the rotational joint comprises a second spring, configured to guide rotation of the device, and wherein the second spring is further configured to return the device to said equilibrium position.

12. The device of claim 11, wherein the second spring comprises a torsion coefficient of 5 to 20 N mm/degree.

13. The device of claim 1, wherein the body section comprises an elongated member and wherein the elongated member comprises a length of 10 to 130 cm, and a diameter of 5 to 12 mm, and wherein the elongated member comprises at least one telescoping section, said telescoping section electrically driven and fixable in height.

14. The device of claim 1, wherein the body section further comprises reflective coating and at least one light emitting device.

15. The device of claim 1, wherein the mobile robot has a height of 20-100 cm, and wherein the device has a height of between 100 and 250 cm.

16. The device of claim 1, wherein the mast has a length of 10 cm to 130 cm.

17. A system for increasing visibility of a mobile robot, the system comprising:
   a device attached to a side of the mobile robot with a rotational joint, wherein the rotational joint allows the device to rotate clockwise and/or anticlockwise relative to a side of the mobile robot, the rotational joint configured to passively return the device to an equilibrium position.

18. The system of claim 17, wherein the rotational joint allows the device to rotate clockwise and/or anticlockwise with respect to an axis perpendicular to the side of the rotational joint between the device and the mobile robot.

19. The system of claim 17, wherein the device further comprises a power source and/or control circuitry configured to at least one of (i) supplying at least one light-emitting device with power, and/or (ii) controlling the at least one light-emitting device, wherein the mobile robot comprises a power and/or control circuitry and wherein the power source and/or control circuitry of the device is fully integrated with the power and/or control circuitry of the mobile robot.

20. The system of claim 17 wherein the device comprises a flexible component.

21. The system of claim 17, wherein the rotational joint comprises a spring, configured to guide rotation of the device, and wherein the spring is further configured to return the device to said equilibrium position.

22. The device of claim 17, wherein while in said equilibrium position, the device is positioned upright or substantially upright, thereby increasing the height of the device.

23. A device in combination with a mobile robot, the device comprising:
(a) a base section attached to an upper front portion of a side of the mobile robot with respect to forward motion of the mobile robot, said base section allowing the device to rotate clockwise and/or anticlockwise relative to the mobile robot, the base section constructed and adapted to passively return the device to an equilibrium position;
(b) a body section comprising a mast, the body section flexibly attached to the base section at a lower extreme of the body section; and
(c) a signaling section on or atop an upper extreme of the body section;
(d) wherein the base section is wider than the body section; and
(e) wherein the mast is wider at the lower extreme than at the upper extreme.

24. The device of claim 23, wherein the base section is attached via a rotational joint to a side of the mobile robot, said rotational joint allowing the device to rotate clockwise and/or anticlockwise with respect to the mobile robot, the rotational joint configured to return the device to an equilibrium position.

25. The device of claim 24, wherein the rotational joint allows the device to rotate clockwise and/or anticlockwise with respect to an axis perpendicular to a surface of the rotational joint between the device and the mobile robot.

26. The device of claim 23, wherein the signaling section comprises (i) at least one display area; and/or (ii) a plurality of light-emitting devices.

27. The device of claim 26 wherein the at least one display area comprises a plurality of display areas.

28. The device of claim 23, wherein the base section comprises a flexible component configured to bend when an external force acts on the device when the device is attached to the mobile robot.

29. The device of claim 28, wherein the flexible component comprises a spring configured to bend when the device is under influence of an external force when the device is attached to the mobile robot, and wherein the spring has a spring constant of 5 to 20 N/mm, preferably of 10 to 15 N/mm.

30. The device of claim 1, wherein while in said equilibrium position, the device is positioned upright or substantially upright, thereby increasing the height of the device.

31. The device of claim 23, wherein the base section comprises a spring, configured to guide rotation of the device, and wherein the spring is further configured to return the device to said equilibrium position.

32. The device of claim 23, wherein while in said equilibrium position, the device is positioned upright or substantially upright, thereby increasing the height of the device.

33. The device of claim 23, wherein said side of the mobile robot is a left side with respect to forward motion of the mobile robot.

* * * * *